United States Patent [19]

Leibundgut

[11] 3,736,843
[45] June 5, 1973

[54] VIBRATOR APPARATUS

[75] Inventor: James A. Leibundgut, Waterford, Wis.

[73] Assignee: Applied Power Industries, Inc., Milwaukee, Wis.

[22] Filed: May 20, 1971

[21] Appl. No.: 145,186

[52] U.S. Cl.................................91/234, 173/114
[51] Int. Cl..............................................F01l 21/02
[58] Field of Search ..................91/55, 234; 92/110; 173/114, 17; 181/.5 H

[56] References Cited

UNITED STATES PATENTS

| | | | |
|---|---|---|---|
| 2,887,989 | 5/1959 | Dulaney | 91/234 |
| 3,608,650 | 9/1971 | Matsusaka | 173/114 |
| 1,043,529 | 11/1912 | MacDonald | 91/234 |

Primary Examiner—Charles J. Myhre
Assistant Examiner—R. H. Lazarus
Attorney—Petherbridge, O'Neil & Lindgren

[57] ABSTRACT

A vibrator apparatus adapted to impart vibrations to a body and including a base structure and a tubular member attached thereto at one end to create a fluid cylinder. A ram piston is mounted in sliding relationship within the fluid chamber and is operably connected to a vibrator piston assembly. The second end of the tubular member is adapted to receive the vibrator piston assembly having attached thereon a bearing surface to contact the body being vibrated. Fluid pressure is introduced into the fluid cylinder in the area between the base plate and the ram piston whereby the vibrator assembly and ram moves in a direction to cause contact of a predetermined force between the bearing surface and the body being vibrated. Thereafter, the fluid pressure within the cylinder causes the vibrator assembly to reciprocate in a manner to impart a desired amplitude and frequency of vibration on the body being vibrated.

11 Claims, 4 Drawing Figures

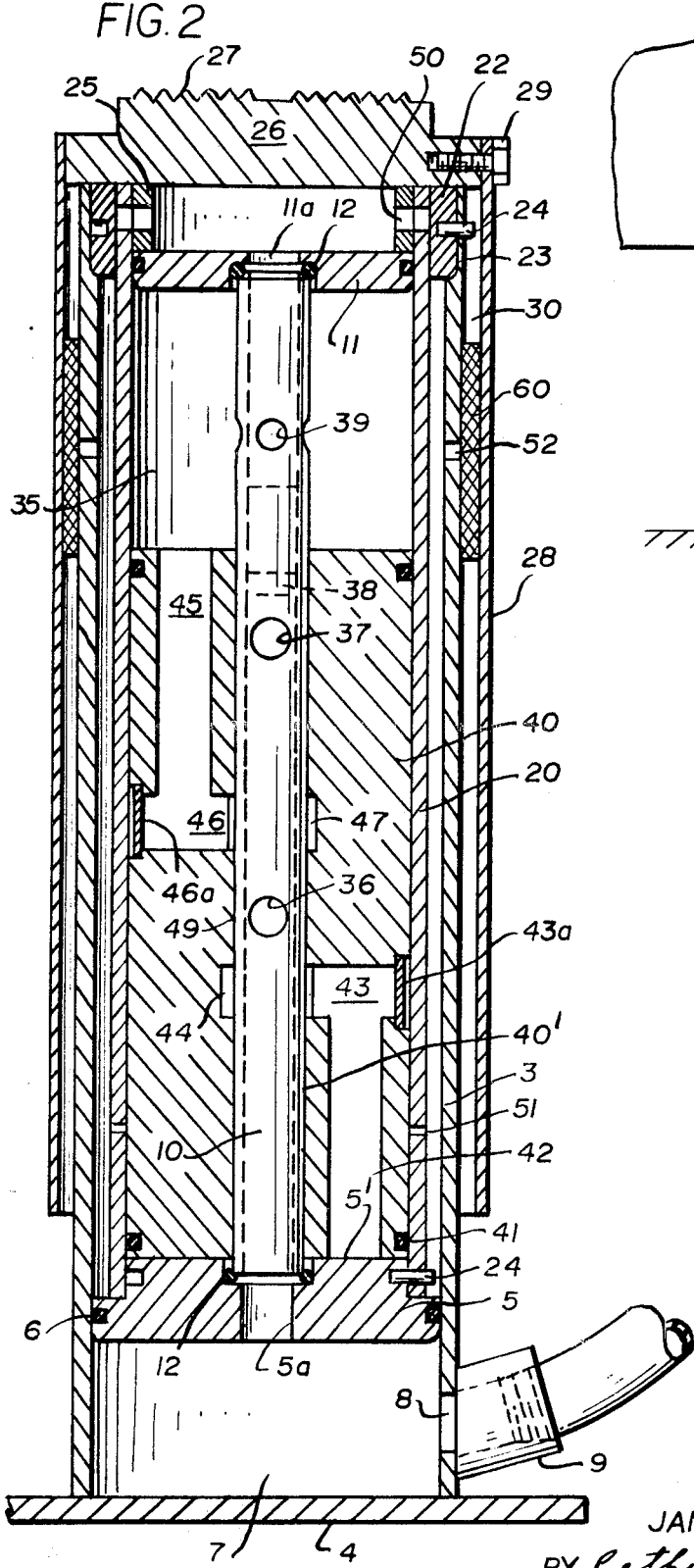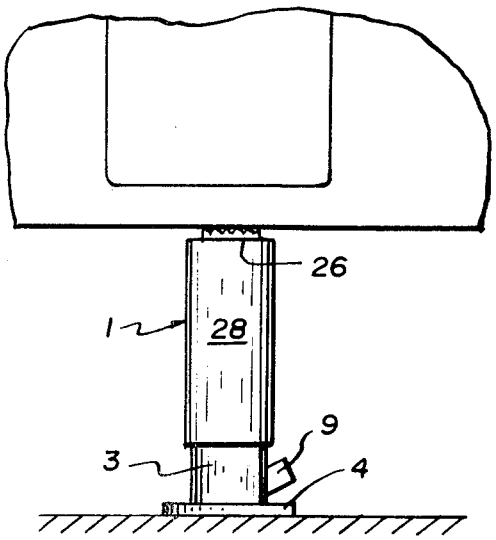

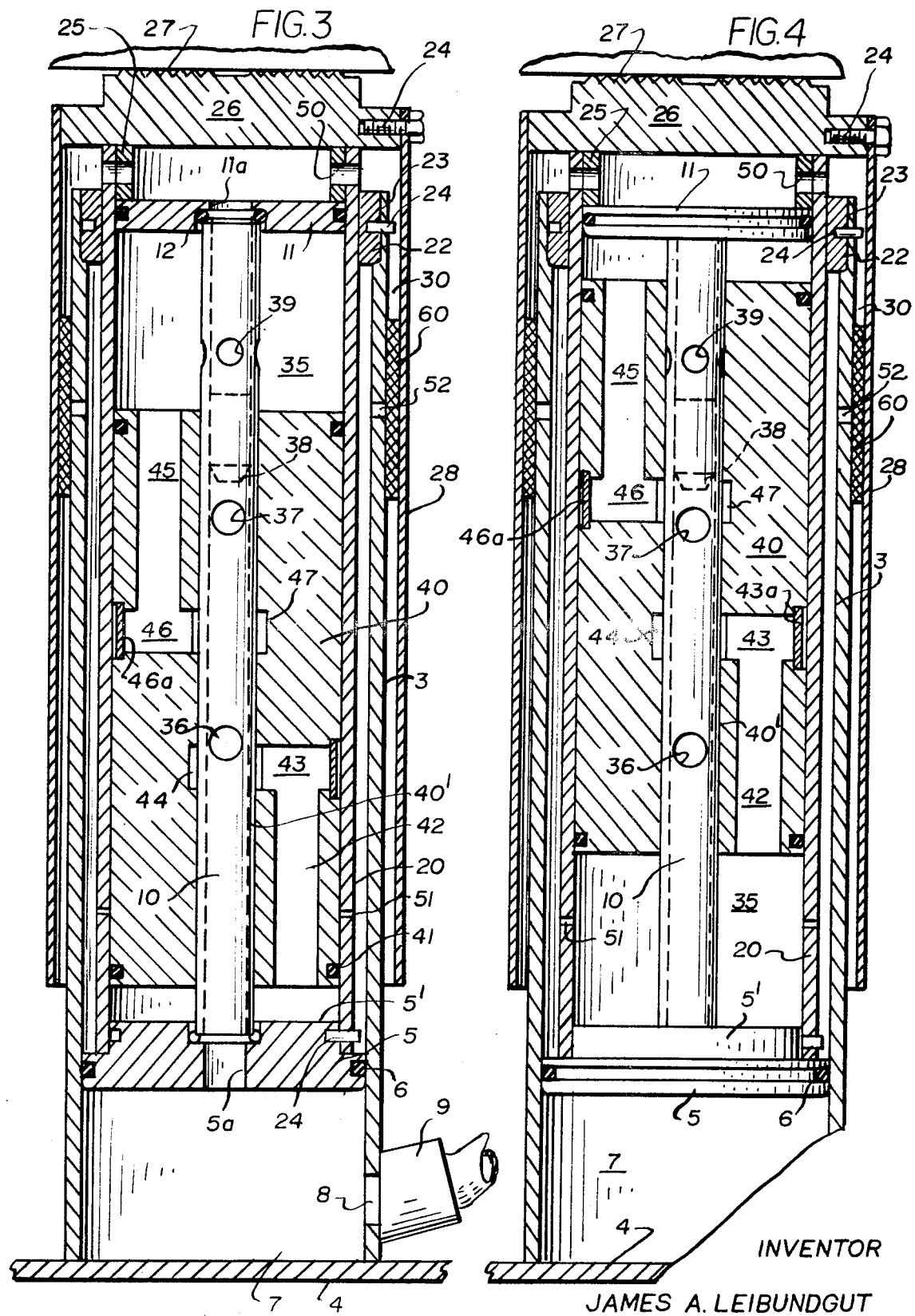

VIBRATOR APPARATUS

BACKGROUND OF THE INVENTION

This invention relates to a fluid operated vibrator and, in particular, to an improved apparatus for vibrating a body such as a vehicle and the like.

More specifically, this invention relates to a fluid operated vibrator apparatus wherein the vibrator is adapted to be positioned between a support surface and a body to be vibrated. The vibrator apparatus includes a ram piston positioned in a hollow cylindrical member having an end closed by a base surface adapted to contact a support surface wherein the cylindrical outer member supports the piston for slidable movement therein. Operatively connected to the ram piston and the hollow cylinder is a vibrator assembly having a reciprocating member which transmits a vibrating force to a body through an object bearing surface positioned at the opposite end of the apparatus from the base surface. An initial fluid pressure is introduced between the base surface and the ram piston to cause the piston to force the vibrator assembly and object bearing surface against the body being vibrated. Thereafter, the vibrator assembly is induced to reciprocate relative to the hollow cylinder and the base to impart a vibratory force on the body in contact with the bearing surface.

Although not intended to be so limited, for convenience of illustration the vibrator apparatus of the invention is described for use in conjunction with vibrating a vehicle such as an automobile for the detection of rattles and the like. As is well known, it is a common problem in automobiles or other vehicles to develop annoying or undesirable noises or rattles which are generally caused by loose or ill-fitting parts which are excited by the vibration induced on the automobile while in motion. Generally, a varying force is imposed on an automobile during motion created by a relatively small, cyclic displacement of the vehicle chassis moving over a road to often cause the improperly fitting parts to produce undesirable sounds.

In the automobile manufacturing/repair industry, attempts have been made to simulate the vibrations induced on a car during movement over roads in a shop or other testing area whereby the noise producing, loose-fitting parts of the vehicle can be identified and located. Many times it is necessary for a mechanical or tester to road test a vehicle in an attempt to locate rattles. Such a technique is inconvenient and ineffective since the driver has difficulty listening for noises while operating the vehicle. In the prior art several vibrators have been utilized to produce the simulation of road rattles within a shop or factory. However, these prior art devices have been deficient in providing a device which quickly and effectively can be placed into operative position in a manner which allows a plurality of vehicles to be tested rapidly or to reduce the work expended for checking for rattles in an automobile. Moreover, many of these prior art apparatus possess a relatively complex structure which fail to properly impart vibratory motions to the vehicle in a manner to effectively detect rattles. Often prior vibrators operate at a level of noise which hinders an operator from hearing a rattle in the vehicle because of interference from the operating sound of the vibrator.

SUMMARY OF THE INVENTION

It is, therefore, an object of this invention to improve the apparatus for creating vibrations.

A further object of this invention is to supply vibratory movement to a body.

Still another object of this invention is to detect and locate noise-producing elements in a vehicle.

Still another object of this invention is to detect rattles in a vehicle with an easily operated and relatively noiseless device.

A still further object of this invention is to supply a vibratory force to a vehicle body without the necessity of physically attaching a device thereto.

These and other objects are attained in accordance with the present invention wherein there is provided a vibrator apparatus that effectively detects noise-producing parts of a vehicle and the like. The apparatus disclosed herein utilizes a fluid operated vibrator system having a contact surface which is placed in contact with the object or body being vibrated to apply a vibratory force to the body. During operation of the vibrator apparatus, the operating noise emitted by the vibrator of the invention is substantially reduced in a manner that rattles can effectively be heard during operation of the device as compared to the relatively noisy prior art vibrator devices now used for detecting rattles.

The novel vibrator apparatus also is capable of inducing vibrations on a vehicle or other body without being physically attached to the body being vibrated to thus reduce the time and labor necessary for placing the vibrator into operation. The invention does not require physical attachment because the vibrator is placed on a support surface such as the ground or a floor and fluid pressure is introduced into the device to effect an upward movement of a contact surface of the vibrator until contact thereof with the body being vibrated. Thereafter, the device effectively imposes a vibratory motion onto the vehicle in a manner such that the contact surface remains in contact with the body being vibrated during operation. The cyclic displacement of the chassis of the vehicle allows an operator to hear any rattles which may exist in the vehicle because of improperly fitting parts and the like and if necessary the frequency and amplitude of vibration can be readily adjusted to better detect the rattles. Therefore, the vibrator apparatus of the invention effectively detects rattles with a device which is relatively non-complex in design, inexpensive to manufacture and convenient to operate.

DESCRIPTION OF THE DRAWINGS

Further objects of the invention together with additional features contributing thereto and advantages accruing therefrom will be apparent from the following description of an embodiment of the invention when read in conjunction with accompanying drawings:

FIG. 1 is a schematic illustration of the vibrator apparatus in operative position beneath a vehicle;

FIG. 2 is a schematic side sectional illustration of the vibrator apparatus of the present invention in a rest position;

FIG. 3 is a schematic sectional illustration of the vibrator apparatus of the invention in one cycle of operation;

FIG. 4 is a schematic sectional side illustration of the vibrator apparatus of FIG. 2 in a second cycle of operation.

DESCRIPTION OF THE EMBODIMENT

Referring now to FIG. 1, there is illustrated the vibrator apparatus 1 of the present invention in position in operative relationship with a vehicle such as an automobile. The vibrator apparatus 1 functions to apply a small amplitude vibration of a selected frequency to the vehicle in a manner to cause the improperly or loose-fitting parts of the vehicle to rattle for detection of the location thereof. The noiseless operation of the vibrator apparatus of the invention permits the rattles to be readily detected without interference from the vibrator. The vibrator assembly is adapted to be positioned beneath the car in suitable positions dependent on the approximate location of the rattles being detected or other encountered circumstances.

Referring to FIGS. 2, 3 and 4, there is illustrated an embodiment of the improved vibrator apparatus of the invention shown in FIG. 1. Vibrator apparatus 1 includes a ram piston receiving cylinder 3 which is permanently attached to a base plate 4 by any suitable securing technique such as welding and the like. Base plate 4 provides a bottom surface which is utilized as a means for positioning the vibrator assembly upon a support surface such as the ground beneath the vehicle being vibrated as shown in FIG. 1. A ram piston 5 having suitable seals 6 mounted around the periphery thereof is slideably positioned within the ram piston cylinder 3 in manner such that a pressure chamber 7 is created at one end of the vibrator apparatus by the confines of the ram piston, the lower cylindrical walls of the cylinder 3 and the base plate. Fluid pressure is introduced into pressure chamber 7 through an inlet opening 8 mounted adjacent an inlet coupling 9 so that pressure from any suitable pressure source may be introduced into the pressure chamber in a manner to be described in detail later.

Ram piston 5 includes a longitudinally extending central opening 5a having an enlarged bored portion on the side of ram piston 5 opposite from the pressure chamber 7. A hollow tube member 10 is inserted into the enlarged portion of passage 5a to form a flow passage from pressure chamber 7 through passage 5a of ram piston 5 into the tube member 10. As shown in FIG. 2 illustrating the vibrator assembly in its rest position, the other end of tube member 10 extends to a point within the ram piston cylinder 3 adjacent the upper end thereof.

The upper end of the hollow tube 10 is supported by means of a static piston 11 which includes a flow passage 11a and an enlarged bore at one side thereof to receive the end of hollow tube. The ends of the hollow tube extending into the enlarged bores of the central passages of ram piston 5 and static piston 11 are sealed respectively by seal members 12.

The face portion 5' of ram piston 5 opposite to the pressure chamber includes a diameter less than the diameter of cylinder 3 to provide a peripheral surface for receiving the end of a vibrator cylinder 20 which is telescoped into the ram piston cylinder 3 in concentric spaced relationship therewith. The end of the vibrator cylinder 20 is secured by two or more retaining pins 24 or other fastner which are inserted through a hole adjacent the end of the vibrator cylinder 20 into a corresponding hole in the surface formed by the smaller outer periphery of face 5' of the ram piston.

The periphery of the static piston 11 is disposed in contact with the interior wall of vibrator cylinder 20 wherein a conventional seal member is interposed between the inner wall of the vibrator cylinder and the periphery of the static piston for sealing purposes. The top end of the vibrator cylinder 20 is positioned in spaced relation to ram piston cylinder 3 by means of a collar member 22 which is inserted into a bored out portion 23 located the end of cylinder 3. A plurality of roll pins 24 or the like which may comprise two or more pins are provided through a suitable hole in the wall of cylinder 3 into a collar 22 for securement of the collar thereto. The interior surface of collar 22 is disposed in surrounding relationship to vibrator cylinder 20 to maintain the vibrator cylinder in proper concentric position relative to cylinder 3 and also to permit relative movement between the vibrator cylinder and the collar.

A ring-like spacer member 25 is positioned concentrically with the inner wall of vibrator cylinder 3 adjacent the end thereof whereby one edge of the spacer contacts a face of static piston 11. As shown in FIGS. 2 to 4, the outer edges of the spacer and vibrator cylinder 20 create a flush, flat surface to contact and support a saddle 26 which contacts the vehicle being subjected to vibratory motion. The saddle 26 includes a bearing surface 27 which contacts the vehicle as shown, for example, in FIG. 1 at its underside and transmits vibratory force from the vibrator to the vehicle for detection of rattles and like. The diameter of saddle 26 is greater than the diameter of ram piston cylinder 3 and a cover tube 28 is secured to the outer periphery thereof. The cover tube 28 is attached to the saddle member by a plurality of conventional screws 29 and tube 28 extends in spaced concentric relationship with the outer periphery of ram cylinder 3 for a substantial length thereof.

From the foregoing it should be apparent that a vibrator chamber 35 is created within the vibrator cylinder 20 by respective faces of ram piston 5 and static piston 11 wherein the hollow tube member 10 extends therebetween centrally of the vibrator chamber 35. Intermediate the length of the hollow member 10 located in spaced relationship are a pair of cross holes 36 and 37 which extend laterally through the walls of the hollow member to create a pair of ports at each cross hole. The particular location of the cross holes with respect to each other and with respect to the ram piston and static piston will be explained in detail later. As viewing FIGS. 3 to 4, a plug member 38 is positioned above second cross hole 37 within the passage of hollow member 10 in a manner to prevent fluid pressure being directed past plug 38 from pressure chamber 7. A pair of cross holes 39 located at the same longitudinal position with respect to each other are drilled through hollow member 10 on the upper side of plug 38 to form four ports which create fluid communication between the vibrator chamber 35 and the chamber 11a defined by static piston 11, spacer 25, and saddle 26.

A vibrator piston 40 is mounted for reciprocating movement within the chamber 35 created within vibrator cylinder 20. Piston 40 is constructed of a suitable material such as metal or plastic and possesses a cylindrical configuration including a central longitudinally extending hole 40' which is adapted to receive hollow tube member 10. A pair of seals 41 seal the periphery of the piston with respect to the inner wall of the vibrator cylinder 20 at the respective ends of the piston. As shown in FIG. 2, an open-ended passage 42 extends from an end face of vibrator piston 40 adjacent ram piston 5 in a direction substantially parallel to the longitudinal axis of vibrator cylinder 20. The inner end of passage 42 interconnects with a radially drilled hole 43 having a cover member 43a at the outer edge thereof to form a right angle flow passage through the piston. A concentrically enlarged fluid inlet 44 is constructed in piston 10 in surrounding relationship to the hollow tube member 10 for fluid communication with radial passage 43 to create an inlet passage thereto.

A second flow passage 45 is provided by an open-ended longitudinal hole extending from the face of piston 40 adjacent static piston 11 to interconnect with a radially drilled passage 46 having cover plate 46a. Radial passage 46 is in fluid communication with a second concentric inlet passage 47 provided in surrounding relation to tube 10. Concentric inlet 44 is positioned at closer position relative to inlet 47 than is the distance between cross holes 36 and 37 for reasons which will be apparent later.

The central hole 40' of vibrator piston 40 surrounds the hollow tube 10 in a manner that a restricted flow is created for a selected distance pass the periphery of the hollow tube. When fluid pressure from a suitable external source (not shown) such as pneumatic pressure is introduced initially into chamber 7 ram piston 5 is forced upward to cause static piston 11, vibrator cylinder 20, spacer 25, saddle 26, and cover tube 28 move relative to cylinder 3 until the surface 27 of the saddle contacts the body being vibrated such as the underside of a vehicle. The movement of the elements from a rest or non-operative position as shown in FIG. 2 to a representative position to contact the vehicle is shown in FIG. 3. The pressure introduced into chamber 7 is selected to be of a level to maintain a predetermined bias contact between the vehicle and the saddle.

Since leakage of pressure occurs along the outer periphery of tube 10, at an instant after pressure is introduced into the chamber to cause contact of the saddle against the car, fluid pressure from chamber 7 begins to leak pass tube 10 to concentric inlet 44 and into passages 42 and 43. As the pressure builds up in passages 42 and 43, piston 40 begins an upward movement in chamber 35 as viewing FIG. 3. Thereafter, as the concentric inlet 44 of the piston moves toward cross hole 36, the restriction to flow is reduced to the point where the cross hole is in direct communication with concentric inlet 44 and the increased pressure introduced through passages 42 and 43 into chamber 35 causes the piston to accelerate rapidly which would be in an upward direction if the vibrator apparatus is placed under a vehicle.

When the vibrator apparatus is operating in the cycle illustrated in FIG. 3, it should be also apparent that as piston 40 is accelerated away from the ram piston, it is desirable that the pressure within the volume between the face of piston 40 and static piston 11 be exhausted so that the piston is effectively accelerated. Therefore, an exhaust passage 50 in communication with static piston chamber 11a is provided through spacer 25 and the end of the wall of vibrator cylinder 20 whereby fluid pressure within the chamber 50a adjacent static piston 11 can be exhausted through exhaust ports 50. The exhausted fluid is then released to the atmosphere through the space created from the clearance 30 existing between the hollow tube, cover tube 28, and the ram piston cylinder 3. To reduce the sound level emitted during operation of the device, a muffler member 60 constructed of any suitable substance as a foam material and the like is attached by any known technique on the outer wall of ram cylinder 3 to muffle the sound and prevent dirt from entering the device.

As the vibrator piston 40 is accelerated toward static piston 11, concentric inlet 44 passes cross hole 36 and the other concentric inlet 47 approaches the vicinity of the other cross hole 37 such that pressure within chamber 35 now sealed from exhausting is compressed to stop movement of piston 40 upward. As best shown in FIG. 4, the approximate position of the piston for acceleration in the opposite direction toward ram piston 5 is shown. Pressure is introduced into passages 45 and 46 from cross hole 37 to increase the pressure within chamber 35 adjacent static piston 11 to cause movement of piston 40 downward toward piston 5.

To insure the effective acceleration of the piston downward as viewing FIG. 4, the space in the vibrator chamber 35 adjacent the ram piston is provided with a plurality of exhaust ports 51 positioned adjacent the bottom end of vibrator piston 40 in FIG. 4 to allow pressure to exit from chamber 35 through the clearance between vibrator cylinder 20 and the inner wall of cylinder 3. The pressure introduced in the clearance between the two cylinders then exits to the atmosphere through an exhaust port 52 provided in the cylinder wall 3 at a location adjacent the muffler 60 for muffling of sound. The muffler is of a sufficient width to insure that the port 52 is covered during the exhausting cycle from port 51. The vibrator piston 40 is stopped and reversed in movement as it approaches ram piston 5 as shown in FIG. 3 to complete a cycle of operation of the device.

During reciprocation of vibrator piston 40 in the manner previously described, the reversal of direction of the piston within the vibrator cylinder produces a vibratory force which is induced on the vehicle being vibrated. It should be apparent that acceleration of piston 40 from one direction to the other creates an opposite reaction on either the ram piston 5 in one direction or the static piston 11 in the other direction. In response to the vibration created by piston 40, vibrator cylinder 20, the static piston, ram piston, and the saddle all move relative to the cylinder wall 3 and the collar 22. If the vibrator is located beneath a vehicle, upward displacement of the vehicle occurs when the vibrator piston 40 reacts with the pressure adjacent the static piston and downward displacement occurs when the movement of the piston reacts with the ram piston. As the piston 40 causes a downward movement of the ram piston and thus the saddle 26, contact between vehicle and saddle is maintained, since the force resulting from the pressure within chamber 7 is greater than the downward force of the piston. The frequency of vibration and the amplitude thereof is dependent on the selected magnitude of pressure introduced into chamber 7 through the inlet.

In the above description, the vibrator apparatus of the invention has been described for illustration as being disposed with a substantially vertical orientation. However, the vibrator herein disclosed may also be oriented for operation in other directions such as a lateral or other slope, if desired. Further, the vibrator may be utilized in other applications where it is desired to apply a small amplitude vibration to a body or a vehicle other than for the detection of rattles.

While the invention has been described with reference to a preferred embodiment, it will be understood by those skilled in the art that various changes may be made and equivalents may be substituted for elements thereof without departing from the true spirit and scope of the invention. In addition, many modifications may be made to adapt a particular situation and material to the teachings of the invention without departing from its essential teaching.

What is claimed is:

1. An apparatus for subjecting a body to a selected vibration comprising
   a housing means defining a piston receiving chamber,
   a piston slideably disposed in sealing relationship along the longitudinal axis of the chamber,
   said piston dividing the chamber into a fluid pressure chamber adapted to receive a predetermined pressure from a pressure source and a vibrator receiving chamber,
   said piston including a central passage,
   conduit means attached at one end to the central passage and extending into the vibrator receiving chamber,
   a vibrating means positioned in the vibrator receiving chamber in surrounding relationship to the conduit means,
   said vibrating means including a contact surface adapted to contact a body to be vibrated,
   said vibrating means further including a vibrator member mounted for reciprocating movement on the conduit means,
   said vibrator member having pressure receiving means for reciprocating the vibrator member,
   port means on said conduit means for creating selective fluid communication between the fluid pressure chamber and the pressure receiving means to effect reciprocating movement of the vibrator piston relative to the conduit means to induce vibration of the body being vibrated, and
   said fluid pressure chamber receiving a bias pressure from the pressure source to effect predetermined movement of the piston to maintain physical contact between the contact surface and the body being vibrated during during vibration thereof.

2. The apparatus of claim 1 wherein the pressure receiving means includes a pair of passages in fluid communication with the vibrator receiving chamber.

3. The apparatus of claim 2 wherein said port means on said conduit means is adapted to achieve alternate fluid communication with each of the said pair of passages to increase the pressure therein to a predetermined level to effect reciprocating movement of the vibrator piston.

4. The apparatus of claim 3 wherein said pressure receiving means includes a pair of spaced inlets positioned adjacent the conduit means in respective communication with the pair of passage means.

5. The apparatus of claim 4 wherein the port means includes a pair of openings extending through the conduit means.

6. The apparatus of claim 5 further including means providing restricted fluid communication between one of the inlets and one of the opening ports when the inlet of the piston is a predetermined longitudinal distance from the one of the ports to commence a buildup of pressure within the respective passage for causing movement of the vibrator member.

7. The apparatus of claim 1 wherein the other end of the conduit means is attached to a static piston positioned in operative contact with said contact surface.

8. The apparatus of claim 1 further comprising means creating an exhaust chamber between the static piston and the contact surface, a passage through the static piston to create fluid communication between the chamber and the conduit means, exhaust port means provided in the conduit means, and flow preventing means located in the conduit means to prevent pressure from the pressure receiving chamber from reaching the exhaust port means whereby exhaust pressure is remove through said exhaust port during movement of the vibrator member in one direction.

9. An apparatus for transmitting vibrations to a body comprising
   a housing means including an elongated chamber having an end surface adapted to contact a support surface,
   a vibrator means positioned in the chamber for relative movement thereto
   a contact surface operatively connected to the vibrator means for contacting a vehicle to be vibrated,
   said vibrator means including a reciprocal member for creating vibration of the contact surface, and
   pressure means operatively connected to the vibrator means for effecting an initial movement of the contact surface into the predetermined bias contact with the body to be vibrated to maintain physical contact between the contact surface and the body being vibrated during vibration thereof and for subsequently effecting reciprocation of the reciprocal member to vibrate the contact surface for transmittal to the body being vibrated.

10. The apparatus of claim 10 wherein said pressure means includes a slideably mounted piston attached to the vibrating means.

11. The apparatus of claim 9 wherein said chamber is divided into a first and second chamber by the reciprocal member,
    said first chamber receiving initial pressure to cause movement of the member to create said predetermined bias contact between the body and the contact surface.

* * * * *